United States Patent [19]

Korpman

[11] 4,136,071
[45] Jan. 23, 1979

[54] MIXED BLOCK POLYMER ADHESIVE
[75] Inventor: Ralf Korpman, Bridgewater, N.J.
[73] Assignee: Johnson & Johnson, New Brunswick, N.J.
[21] Appl. No.: 687,573
[22] Filed: May 18, 1976
[51] Int. Cl.$^2$ .............................................. C08L 93/00
[52] U.S. Cl. ............................ 260/27 BB; 260/876 B; 428/462
[58] Field of Search ................ 260/27 R, 876, 876 B, 260/27 BB

[56] References Cited
U.S. PATENT DOCUMENTS

| | | | |
|---|---|---|---|
| 3,239,478 | 3/1966 | Harlan | 260/27 |
| 3,519,585 | 7/1970 | Miller | 260/894 |
| 3,787,531 | 1/1974 | Dahlquist | 260/876 |
| 3,984,509 | 10/1976 | Hall et al. | 260/32.8 R |
| 4,080,348 | 3/1978 | Korpman | 260/27 BB |

Primary Examiner—Melvyn I. Marquis

[57] ABSTRACT

A broad performance pressure-sensitive adhesive based upon A-B-A and A-B block copolymers. The adhesive possesses a superior balance of properties when extruded and comprises a major proportion of styrene-isoprene-styrene A-B-A block copolymer elastomers and a minor proportion of styrene-isoprene A-B block copolymer elastomers, in its elastomeric component. Suitable proportions of tackifier resins for these elastomers also are included.

3 Claims, No Drawings

MIXED BLOCK POLYMER ADHESIVE

The present invention relates to thermoplastic elastomeric pressure-sensitive adhesives and more particularly to such adhesives which are based on A-B-A block copolymers.

Such adhesives are disclosed generally in U.S. Pat. Nos. 3,419,585, 3,676,202, 3,723,170 and 3,787,531. U.S. Pat. Nos. 3,676,202 and 3,723,170 disclose the advatages of these adhesives when the B-blocks are derived from isoprene and the A-blocks preferably are derived from styrene, including the advantages of particular tackifiers. U.S. Pat. Nos. 3,519,585 and 3,787,531 disclose the advantages of mixing certain A-B block copolymers with certain A-B-A block copolymers in similar pressure-sensitive adhesive formulations.

I have discovered that a superior balance of properties for most industrial and other applications can be attained with pressure-sensitive adhesive formulations employing particular types of A-B-A and A-B block copolymers in particular proportions. More specifically, the adhesive composition of this invention comprises a thermoplastic elastomeric component and a resin component and the thermoplastic elastomeric component consists essentially of about 50–90 parts, preferably about 60–80 parts, of a linear or radial styrene-isoprene-styrene A-B-A block copolymer and about 10–50 parts, preferably about 20–40 parts of a simple styrene-isoprene A-B block copolymer. The A-blocks are derived from styrene or styrene homologues and the B-blocks are derived from isoprene, either alone or in conjunction with small proportions of other monomers, in both the A-B-A and A-B block copolymers.

As indicated above, the A-B-A block copolymers of this invention are of the type which consists of A-blocks (end blocks) derived, i.e., polymerized, from styrene or styrene homologues; and B-blocks (center blocks) derived from isoprene either alone or in conjunction with small proportions of other monomers. The individual A-blocks have a number average molecular weight of at least about 7,000, preferably in the range of about 12,000–30,000, and the A-blocks constitute about 10–35 percent by weight of the block copolymer. The number average molecular weight of the B-blocks for linear A-B-A block copolymers preferably is in the range of about 45,000–180,000 and that of the liner copolymer, itself, preferably is in the range of about 75,000–200,000. The number average molecular weight of the radial A-B-A block copolymers preferably is in the range of about 125,000–400,000, and that of the corresponding B-blocks preferably is about 95,000–360,000.

The radial A-B-A polymers useful in this invention are of the type described in U.S. Pat. No. 3,281,383 and conform to the following general formula: $(A-B-)_nX$, wherein A is a thermoplastic block polymerized from styrene or styrene homologues, B is an elastomeric block polymerized from a conjugated diene such as butadiene or isoprene, X is an organic or inorganic connecting molecule, with a functionality of 2–4 as described in U.S. Pat. No. 3,281,383 or possibly with a higher functionality as described in the article entitled "New Rubber is Backed by Stars" appearing on page 35 of the June 11, 1975 issue of *Chemical Week*. "n" then is a number corresponding to the functionality of X.

In the styrene-isoprene derived A-B block copolymers of this invention, the number average molecular weight of the individual A-blocks should be about 7,000–20,000 and the total molecular weight of the block copolymer generally should not exceed about 150,000. A-B block copolymers based on styrene and isoprene are described generally in U.S. Pat. No. 3,787,531.

The elastomeric component of the adhesive composition of this invention may include small amounts of other more conventional elastomers but these should not exceed about 25 percent by weight of the elastomeric component. These include natural rubbers, synthetic rubbers based on butadiene, isoprene, butadiene-styrene, butadiene-acrylonitrile and the like, butyl rubbers, and other elastomers.

The adhesive composition of this invention includes about 20–300 parts preferably 50–150 parts, of resin component, per one hundred parts by weight of the thermoplastic elastomeric component. The resin component consists essentially of tackifier resins for the elastomeric component. In general any compatible conventional tackifier resin or mixture of such resins may be employed. These include hydrocarbon resins, rosin and rosin derivatives, polyterpenes, and other tackifiers.

The adhesive composition of this invention also may include small amounts of various other materials such as anti-oxidants, heat stabilizers and ultraviolet absorbers, fillers, and the like. Typical antioxidants are 2,5 ditertiary amyl hydroquinone and ditertiary butyl cresol. Similarly, conventional heat stabilizers such as the zinc salts of alkyl dithiocarbamates may be used. Similarly, the particulate mixture of this invention may include small amounts of fillers and pigments such as zinc oxide, aluminum hydrate, clay, calcium carbonate, titanium dioxide, carbon black and others.

As indicated hereinbefore, the adhesive of this invention possesses a superior balance of properties and is particularly advantageous for application by extrusion or a melt system. Some difficulty has been experienced in coating adhesives based on A-B-A block copolymers in the form of a hot extrudate in that anchorage between the adhesive layer and certain backings is not always satisfactory. Efforts to correct this have resulted in loss of other important properties. The adhesive of this invention provides excellent mass anchorage, i.e., anchorage of the adhesive layer to its backing, without sacrificing adhesive strength, tack or quickstick and holding properties. It also exhibits excellent fiber wetting on boxboard.

Other and further advantages of the invention will appear to one skilled in the art from the following description, examples and claims.

The following examples are given only by way of illustration and are not intended to limit the scope of the invention in any way. Table A gives the adhesive composition formulations for Examples I–IV and the physical characteristics, including coating weight, after the compositions are applied to a backing of polyvinyl chloride coated unbleached cotton cloth on the side opposite to the polyvinyl chloride coating and slit to produce pressure-sensitive adhesive tapes one inch wide.

In the examples, all proportions are expressed in parts per one hundred parts by weight of the total elastomeric component unless otherwise indicated. Mass weight is the weight of the dry coated adhesive and is given in ounces per square yard.

Anchorage is measured in ounces per inch recorded on an Instron tensile tester operated at 12 inches per minute to strip the adhesive of this invention from its backing cloth at an angle of 90 degrees to the plane of the backing. This is accomplished by laminating a one inch by twelve inch sample strip of very high adhesion and high anchorage pressure-sensitive adhesive tape "adhesive-to-adhesive" to a one by twelve inch sample of the adhesive tape of this invention, and then separating the two at 90° as described above. The separation force then is recorded. Normally this strips the adhesive of this invention from its backing, although delamination or splitting of the adhesive, itself, also may occur to some extent.

Adhesive strength or adhesion to steel is measured by peeling the tape backing over itself 180° at a constant speed (by a force applied to the free end of the tape) from a smooth steel surface to which it has been applied by a fixed pressure. For the techniques used in conducting this test, see the 180° peel adhesion test PSTC-1 of the Pressure Sensitive Tape Council.

Quickstick is measured by laying a length of tape, adhesive side up, upon a horizontal surface and then rolling a plastic ping pong ball down an incline onto the adhesive. The vertical height at which the ball starts and the distance the ball rolls along the tape before coming to rest is measured. Quickstick is reported as the height in inches raised to the three-halves power, divided by the distance rolled in inches. This ratio is found to be a constant for a given tape. The ball used is approximately 1 inch in diameter, and weighs approximately 2 grams. Its outer surface is carefully cleaned between each test.

20° Hold to chrome is measured at room temperature, i.e., 25° C. by noting the time in hours that it takes for a ¼ inch wide strip of tape to be pulled from a chrome coated steel plate by a 400 gram weight attached to the bottom of the tape. For this purpose, a ¼ inch length at the end of the tape is adhered to the chrome plate which is disposed at 20° to the vertical in such a way that the tape attached to the weight below the adhered portion makes a 20° angle with the plate.

TABLE A

| Ingredients and Characteristics | Examples | | | |
|---|---|---|---|---|
| | I | II | III | IV |
| S-I-S Linear Copolymer | 100 | 85 | 75 | 50 |
| S-I Simple Block Copolymer | 0 | 15 | 25 | 50 |
| Wingtack 95 Tackifier Resin | 80 | 80 | 80 | 80 |
| Zinc Dibutyl Dithiocarbamate | 2 | 2 | 2 | 2 |
| 2,5 Ditertiary Amyl Hydroquinone | 0.5 | 0.5 | 0.5 | 0.5 |
| Mass Weight, oz./sq. yd. | 4 | 3.9 | 3.8 | 4 |
| Anchorage, oz./inch | 60 | 108 | 144 | 192 |
| Adhesion to Steel, oz./inch width | 45 | 41 | 46.5 | 57 |
| Quickstick | 5 | 9 | 9 | 16 |
| 20° Hold to Chrome, hrs. | >24 | >24 | 18.33 | 12.5 |

In the above examples, Example I is a control which contains no S-I simple block copolymer. Examples II, III, and IV contain 15, 25 and 50 parts of the S-I copolymer by weight of the total block copolymers with corresponding decreases in the amount of S-I-S copolymer. It will be seen that anchorage increases drastically with the addition of S-I copolymer, i.e., 80% with 15 parts, 140% with 25 parts and 220% with 50 parts. Quickstick also increases with the addition of S-I copolymer as does fiber wetting on boxboard. Adhesion to steel also increases at higher levels of S-I copolymer. On the other hand hold, i.e, 20° hold to chrome, while it does decrease with the addition of S-I copolymer, remains at quite a high level with up to 50 parts S-I copolymer. At higher levels of S-I copolymer hold decreases substantially.

In the examples, the S-I-S linear copolymer and the S-I simple block copolymer both are polymerized from isoprene (the I blocks) and styrene (the S blocks) to produce 15 percent S blocks by weight of the total copolymer. The number average molecular weight of the S-I-S copolymer is 125,000 and that of the S-I copolymer is 110,000.

Wingtack 95 tackifier resin is a solid tackifier resin consisting predominantly of polymerized structures derived from piperylene and isoprene, with the ratio of piperylene to isoprene derived structures being at least about 8 or 9 to 1, and with the remainder being derived from mono-olefins. It appears to contain about 12–15 percent unsaturation based upon percentage of units in each molecule having a double bond. The said resin is polymerized from a stream of aliphatic petroleum derivatives in the form of dienes and mono-olefins having 5 or 6 carbon atoms all in accordance with the general teachings of the aforesaid U.S. Pat. No. 3,577,398. This resin possesses a softening point of about 95° C. by the ball and ring method, a number average molecular weight of about 1,100 and is offered commercially by Goodyear Tire and Rubber Company.

Having now described the invention in specific detail and exemplified the manner in which it may be carried into practice, it will be readily apparent to those skilled in the art that innumerable variations, applications, modifications, and extensions of the basic principles involved may be made without departing from its spirit or scope.

What is claimed is:

1. A pressure-sensitive adhesive composition comprising a thermoplastic elastomeric component and a resin component; said thermoplastic elastomeric component consisting essentially of about 50–90 parts of a linear or radial A-B-A block copolymer and about 10–50 parts of a simple A-B block copolymer, said A-blocks being derived from styrene or styrene homologues and said B-blocks being derived from isoprene; said resin component consisting essentially of about 20–300 parts of tackifier resin for said elastomeric component; all of said parts being parts per one hundred parts by weight of the thermoplastic elastomeric component.

2. A pressure-sensitive adhesive composition according to claim 1, which comprises about 60–80 parts of the A-B-A copolymer and about 20–40 parts of the A-B copolymer, per one hundred parts by weight of the thermoplastic elastomeric component.

3. A pressure-sensitive adhesive composition according to claim 1, which comprises about 50–150 parts of tackifier resin per one hundred parts by weight of the thermoplastic elastomeric component.

* * * * *